Nov. 9, 1954
F. MOSCATO
2,693,963
LETTER FORMING PUZZLE ARRANGEMENT
Filed April 24, 1952
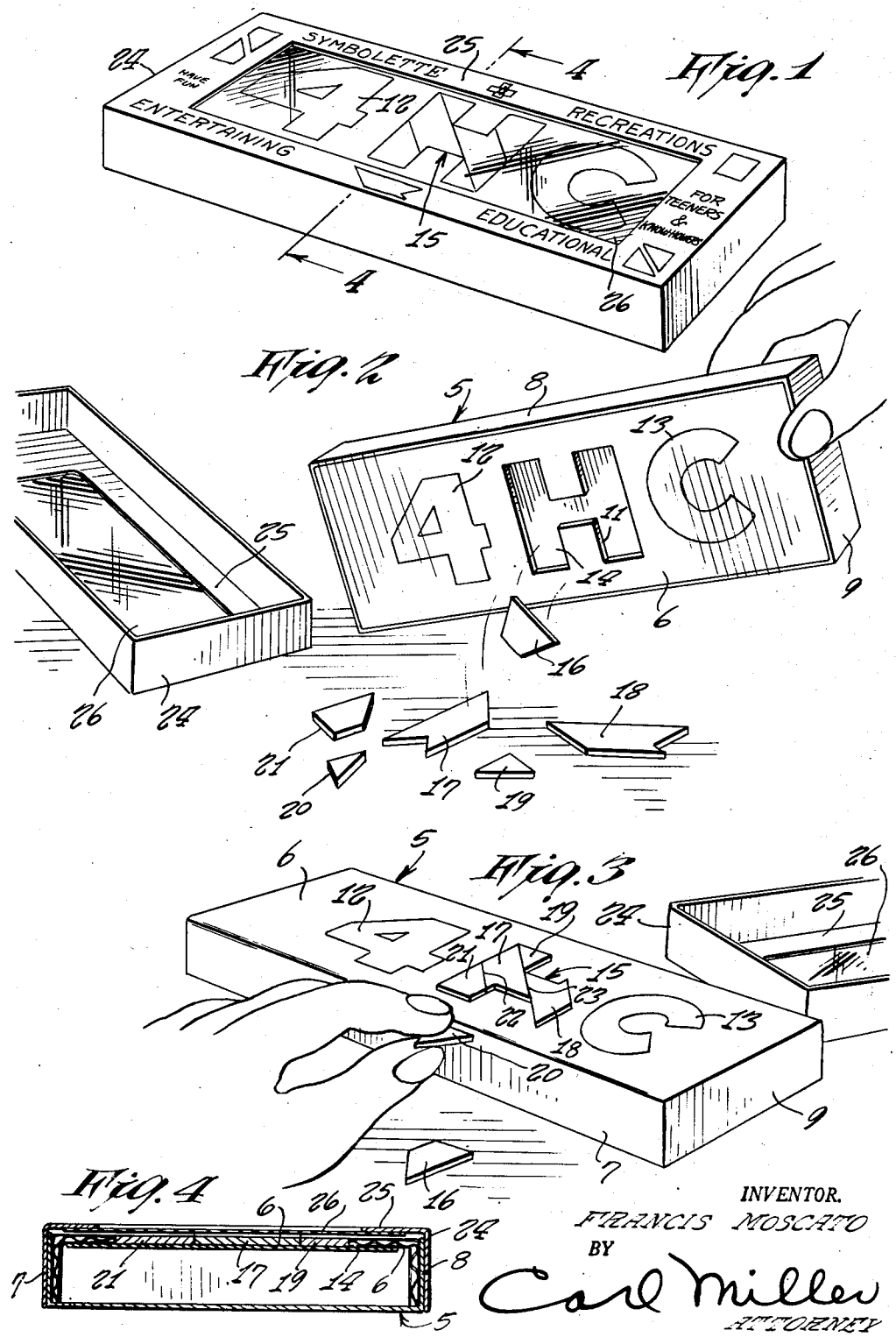
INVENTOR.
FRANCIS MOSCATO
BY
Carl Miller
ATTORNEY

United States Patent Office 2,693,963
Patented Nov. 9, 1954

2,693,963

LETTER FORMING PUZZLE ARRANGEMENT

Francis Moscato, Brookhaven, N. Y.

Application April 24, 1952, Serial No. 284,137

1 Claim. (Cl. 273—157)

The present invention relates to toys, entertainment and educational devices in the field of figures and letters or symbols, a letter forming puzzle arrangement or assembly.

The main object of my invention is to provide an educational and entertaining device for training investigative and creative faculties of the mind by means of tangible elements to be brought together in a predetermined and intelligible form.

Another object of the invention is to provide such an entertainment device in the form of a letter or symbol unit or group that is intended to be built up of parts brought together in a special manner that is not obvious to an observer nor visually suggested.

A further object is to have such a letter or symbol device in which at least one letter or symbol is cut apart along independent lines that are problematical with respect to the actual symbol involved or how the parts are to be fitted together, when assembled.

It is also an object to have such a letter or symbol device that is not only educational, but also sufficiently entertaining and interesting to attract attention and invite use, and which in addition is actually an art or craft.

An important object is to have an educational and interesting entertainment device of the character indicated that may include letters and/or figures combined from geometrical forms, depending on the particular emblem selected.

It is likewise an object to have the letters or figures of the device adapted to be mounted or assembled upon a special case forming a support for the emblem to be formed by assembling the various parts of the toy, device or game as a whole.

An ancillary object is to have such a device provided with a supporting case having a cover with a transparent window through which the completed symbol or letter may be seen.

An important practical object is to make such a device in a simple and low cost form that will encourgae wide distribution on the market.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a perspective view of an educational and entertainment device made according to the invention and embodying the same in a practical form;

Figure 2 is another perspective view of the same showing the device taken apart and ready for use;

Figure 3 is a further view of the same device showing the symbol or device being assembled; and Figure 4 is a transverse section as taken on line 4—4 in Figure 1.

Throughout the views, the same reference numerals indicate the same or like parts.

The modern trend in games and devices and toys for young people is to make such devices both entertaining and educational, in order to stimulate the mind in creative and useful directions without seeming to educate. In fact, even intelligence and aptitude tests are often conducted along the lines of what may actually be considered educational games or toys and devices in which selection of various parts, figures and symbols forms the test and solution intended in connection with the device involved.

It has therefore occurred to me that a toy, game or device comprising a letter forming puzzle arrangement or assembly may be simply made in such form as to challenge the observation and intelligence of a child and even of young adults. As a result, I have succeeded in producing such a game or device along the lines already suggested, which I shall now proceed to describe in detail in the following.

Hence, in the practice of my invention, and referring also again to the drawing, the letter forming puzzle arrangement or game primarily includes a backing box or block 5 that may be of any construction, so long as it is reasonably light and readily handled and provided with an upper substantially flat supporting surface 6. This box 5 may have the sides 7, 8 and two ends 9 (one shown) and bottom 10, but could also be of light solid material throughout, if preferred. In the top surface 6 is recessed a depressed recess 11 (Figure 2) having a profile corresponding to a letter or figure, in the illustrative case, that of a capital or upper case H. Two additional solid or fixed illustrative figures or letters 12 and 13 are also applied by printing or in any other manner to top surface 6 to flank the inserted or built up letter H about to be described more minutely. However, in order to support the insert letter just referred to, an inner supporting board 14 is secured to the underside of the top member 6 by gluing or stapling, etc.

In the recess 11 is normally assembled the letter H, generally indicated at 15 and consisting of several common geometrical pieces 16, 17, 18, 19, 20 and 21 cut to form narrow strips. When assembled, the meeting edges 22, 23, etc. are parallel and disposed at inclined angles with respect to the actual outline and especially the sides of the letter so that no clue will be imparted to the observer or player as to how the parts are intended to fit together. This is readily apparent upon noting Figure 2, wherein the letter parts or geometrical pieces 16 to 21 do not even appear as parts of a letter but as sections from a strip of material having parallel side edges with peculiar ends. The only clue is the form of the recess 11 into which the parts will be inserted to form the letter H or any other letter or figure 15. Two letter forming parts 19 and 20 are triangular in outline or profile, and a second pair 16 and 21 are of trapezoidal outline or profile, while a third pair are of pentagonal outline with sides of different lengths.

More than one such letter 15 may be included as part of the game or apparatus, if desired, while means may be included for protecting the device when about to be stored away. Thus, a cover 24 is adapted to fit over the supporting box 5 having the top 25 thereof fitted with a plastic window 26 through which the letters 12, 13 and 15 may be viewed, this window also serving the purpose of retaining the letter parts 16 to 21 in place when assembled in position. It is to be particularly noted that the pieces 16 to 21 are geometrical in outline or profile and that the letter H is formed in the example shown, wherein two other solid letters at 12 and 13 flank this built-up letter. These flanking solid letters may be replaced by others while still using the same built-up letter between them, as this central letter is the only one intended thus to be assembled from the geometrical pieces, whether the panel 6 is recessed at 14 or not.

Manifestly, variations may be resorted to, and parts and features may be modified or used without others within the scope of the appended claim.

Having now fully described my invention, I claim:

A letter forming puzzle arrangement including a substantially flat support having indicia thereon to guide a player in placing letter parts of different geometrical outline in predetermined positions to form the letter H, the upper surface or top portion of the support having a recess therein with an outline or profile corresponding to the letter H to be assembled upon said support, a plurality of geometrical letter parts adapted to form the upper case letter H when assembled in place on said support in said recess, the letter parts being cut along substantially parallel diagonal lines that are wholly independent of the outline of the letter H formed by said parts and inclined with respect to the sides of said letter H to be assembled or built up, and a pair of solid or fixed letters indicated upon the support to flank the built up letter H on both sides of the latter when assembled, the solid or fixed flanking letters on said support being flat and flush with the surface thereof, and said recess being of sufficient depth to locate the parts of the built up letter H substantially flush with the upper surface of said support when assembled in said recess, two of the geometrical pieces or letter parts being of triangular outline, two of trapezoidal outline, and two of pentagonal outline with sides of different lengths.

References Cited in the file of this patent

UNITED STATES PATENTS

| Number | Name | Date |
|---|---|---|
| 1,290,761 | Lester | Jan. 7, 1919 |
| 1,630,530 | Fryer | May 31, 1927 |
| 1,789,782 | Shockley | Jan. 20, 1931 |
| 2,037,966 | Dailey | Apr. 21, 1936 |

OTHER REFERENCES

Washington Daily News (clipping), February 27, 1930.